United States Patent
Seeger et al.

(10) Patent No.: US 6,335,390 B1
(45) Date of Patent: Jan. 1, 2002

(54) AQUEOUS COATING COMPOSITIONS COMPRISING METALLIC PIGMENT

(75) Inventors: Oliver Seeger, Mannheim; Norbert Mronga, Dossenheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/447,567

(22) Filed: Nov. 23, 1999

(30) Foreign Application Priority Data

Dec. 18, 1998 (DE) .......................... 198 58 460

(51) Int. Cl.⁷ ................................ C08K 5/16
(52) U.S. Cl. .................. 524/186; 524/430; 524/431; 523/210; 427/419.1; 427/419.2; 427/419.5
(58) Field of Search ................ 106/404, 456, 106/459; 427/412.5, 418, 419.1, 419.2, 419.5; 524/427, 429, 430, 431, 437, 186; 523/205, 206, 210

(56) References Cited

U.S. PATENT DOCUMENTS

| | | |
|---|---|---|
| 2,848,344 A | 8/1958 | Brown |
| 3,508,943 A | 4/1970 | Watanabe et al. |
| 4,084,983 A | 4/1978 | Bernhard et al. |
| 4,328,042 A | 5/1982 | Ostertag et al. |
| 4,565,716 A | 1/1986 | Williams, Jr. et al. ...... 427/216 |
| 4,598,020 A | 7/1986 | Panush et al. |
| 4,978,394 A | 12/1990 | Ostertag et al. |
| 5,025,041 A | 6/1991 | Pfenninger et al. |
| 5,102,457 A | 4/1992 | Braig et al. ............... 106/14.16 |
| 5,215,579 A | 6/1993 | Keemer et al. |
| 5,352,286 A | 10/1994 | Schmid et al. |
| 5,368,944 A | 11/1994 | Hartung et al. |
| 5,374,306 A | 12/1994 | Schlegel et al. ............. 106/404 |
| 5,389,139 A | 2/1995 | Carpenter et al. |
| 5,474,605 A | 12/1995 | Schmid et al. |
| 5,607,504 A | 3/1997 | Schmid et al. |
| 5,681,622 A | 10/1997 | Vogt-Birnbrich et al. 427/407.1 |
| 5,942,030 A | 8/1999 | Schuhmacher et al. ..... 106/493 |
| 6,069,218 A | 5/2000 | Vogt-Birnbrich et al. ... 526/301 |

FOREIGN PATENT DOCUMENTS

| | | |
|---|---|---|
| EP | 0 033 457 A2 | 8/1981 |
| EP | 0 338 428 A1 | 10/1989 |
| EP | 0 580 022 A2 | 1/1994 |
| EP | 0 595 131 A2 | 5/1994 |
| EP | 0 678 561 A2 | 10/1995 |
| EP | 0 708 154 A2 | 4/1996 |
| WO | WO 92/15405 | 9/1992 |

*Primary Examiner*—Edward J. Cain
*Assistant Examiner*—Katarzyna I Wyrozebski-Lee
(74) *Attorney, Agent, or Firm*—Oblon, Spivak, McClelland, Maier & Neustadt, P.C.

(57) ABSTRACT

Aqueous coating compositions comprise a water-soluble or water-dispersible film-forming polymer, a metallic pigment based on coated metal flakes, an organic nitro compound which is further carboxyl-, carbonyl- and/or hydroxyl-functionalized, and an organic solvent in which the nitro compound is soluble, along with further components customary for aqueous coating compositions.

20 Claims, No Drawings

AQUEOUS COATING COMPOSITIONS COMPRISING METALLIC PIGMENT

The present invention relates to novel aqueous coating compositions which comprise a water-soluble or water-dispersible film-forming polymer, a metallic pigment based on coated metal flakes, an organic nitro compound which is further carboxyl-, carbonyl- and/or hydroxyl-functionalized, and an organic solvent in which the nitro compound is soluble, along with further components customary for aqueous coating compositions.

The invention additionally relates to the preparation of these coating compositions.

Furthermore, the invention relates to pigment preparations which comprise a metallic pigment based on coated metal flakes, an organic nitro compound which is further carboxyl-, carbonyl- and/or hydroxyl-functionalized, and an organic solvent in which the nitro compound is soluble or dispersible.

The invention also relates not least to the use of organic nitro compounds which are further carboxyl-, carbonyl- and/or hydroxyl-functionalized for stabilizing metallic pigments based on coated metal flakes in aqueous coating compositions.

Metallic pigments belong to the group of the luster pigments, which are increasingly being employed in numerous segments of industry: for example, in automotive finishes, in decorative coating, in plastics pigmentation, in paints, in printing inks and in cosmetics. Their optical effect is based on the directed reflection of light at predominantly sheetlike, mutually parallel-oriented, metallic pigment particles. There is particular interest in metallic pigments with a multiphase composition, which are coated, for example, with thin films of metal oxides such as iron(III) oxide, titanium dioxide, chromium(III) oxide and/or silicon dioxide and which on the basis of interference, reflection and possibly absorption phenomena create angle-dependent color and lightness effects (EP-A-033 457, EP-A-338 428, EP-A-580 022, EP-A-708 154). Particularly noteworthy among these are the iron(III) oxide-coated aluminum pigments, which feature bright gold and orange hues with a pronounced lightness flop.

However, the oxide layer of these pigments is not always able to provide the aluminum substrate flakes with sufficient protection against attack by liquid water or water vapor, so that in contact with water the evolution of hydrogen is observed. Consequently, these pigments cannot be employed in aqueous coating compositions in the absence of additional stabilization. Such stabilization is necessary in particular when the pigments are combined with finely divided oxide-type pigments or fillers, examples being finely divided transparent iron oxides or finely divided titanium dioxide, something which is desirable on the basis of the attractive color effects.

To stabilize uncoated aluminum pigments against water there are a range of well-known methods, such as phosphating, chromating and vanadating. Aliphatic and aromatic nitro compounds are also used for this purpose. For instance, U.S. Pat. No. 2,848,344 uses nitro-functional hydrocarbons such as nitroethane, nitropropane and nitrobenzene to stabilize aluminum flakes against small amounts of water, in the presence of a fatty acid lubricant and a hydrocarbon solvent. In U.S. Pat. No. 5,215,579, nitroethane is combined with phosphates in order to produce aluminum pigment preparations for aqueous coating compositions.

Further, EP-A-595 131 and 678 561 describe the passivation of uncoated and iron oxide-coated aluminum pigments by gas-phase decomposition of volatile compounds of phosphorus, of silicone and of vanadium in the presence of the pigment particles.

It is an object of the present invention to provide metallic pigments based on coated metal flakes with simple but effective stabilization, without detracting from their color properties, such that they can be employed universally in aqueous coating compositions.

We have found that this object is achieved by aqueous coating compositions which comprise a water-soluble or water-dispersible film-forming polymer, a metallic pigment based on coated metal flakes, an organic nitro compound which is further carboxyl-, carbonyl- and/or hydroxyl-functionalized, and an organic solvent in which the nitro compound is soluble, along with further components customary for aqueous coating compositions.

We have also found a process for preparing the aqueous coating compositions, which comprises dissolving the nitro compound in the organic solvent, then mixing this solution first with the metallic pigment and subsequently with the further components of the coating composition.

We have also found pigment preparations which comprise a metallic pigment based on coated metal flakes, an organic nitro compound which is further carboxyl-, carbonyl- and/or hydroxyl-functionalized, and an organic solvent in which the nitro compound is soluble or dispersible.

Not least, we have also found the use of organic nitro compounds which are further carboxyl-, carbonyl- and/or hydroxyl-functionalized for stabilizing metallic pigments based on coated metal flakes in aqueous coating compositions.

The aqueous coating compositions of the invention comprise the above-described metallic pigments as color-imparting component, particular importance being attached to aluminum flakes coated with metal oxides, especially with metal oxides of high refractive index such as chromium oxides (especially $Cr_2O_3$), titanium oxides (especially $TiO_2$) and, in particular, iron oxides (especially $Fe_2O_3$).

The coating compositions of the invention customarily contain from 0.1 to 10% by weight of metallic pigment.

The organic nitro compound in the coating compositions of the invention stabilizes the metallic pigments effectively and simply. The nitro compound is further carboxyl-, carbonyl- and/or hydroxyl-functionalized and can be aliphatic or aromatic but preferably is aromatic. Aromatic carboxylic acids, alcohols, aldehydes and ketones which contain a benzene ring carrying up to 3 nitro groups are preferred.

Examples of preferred nitro compounds are 2-, 3- and 4-nitrobenzoic acid, 3,5-dinitrobenzoic acid, 2- and 3-nitrophthalic acid, 3- and 5-nitrosalicylic acid, 2-nitrophenylacetic acid, 2-, 3- and 4-nitrophenol, 2,3,5-trinitrophenol (picric acid), 2-, 3- and 4-nitrobenzaldehyde, and 2-, 3- and 4-nitroacetophenone.

With the aid of the nitro compounds employed in accordance with the invention it is possible to stabilize the metallic pigment effectively against attack by water without detracting from its color properties.

Based on the coating composition, the amount of nitro compound employed is generally from 0.01 to 10% by weight, preferably from 0.02 to 3% by weight and, with particular preference, from 0.03 to 1% by weight.

The coating compositions of the invention additionally comprise an organic solvent in which the nitro compound is soluble.

This solvent is preferably a polar solvent which is a customary component of the coating composition. It is of course also possible to use an additional solvent which is compatible with the other components of the coating composition.

Examples of particularly suitable solvents are alkylene glycol -monoethers, preference being given to ethylene glycol mono-$C_1$–$C_8$-alkyl ethers and propylene glycol mono-$C_1$–$C_8$-alkyl ethers and particular preference to the corresponding $C_1$–$C_4$-alkyl ethers; further particularly suitable solvents are alkylene glycol ether acetates, and ketones. Individual examples that may be mentioned include ethylene glycol monopropyl and monobutyl ether, 1,2-propylene glycol monomethyl and monoisopropyl ether, propylene glycol monoethyl ether acetate, methyl ethyl ketone, methyl propyl ketone, methyl isobutyl ketone and methyl hexyl ketone, particular preference being given to ethylene glycol monobutyl ether and propylene glycol monomethyl ether.

The film-forming polymer employed in the coating compositions of the invention can be any of the polymers known for aqueous systems (e.g. varnishes, paints, and printing inks), examples being polyurethane resins, polyester resins, acrylic resins and/or alkyd resins; polyurethane resins are preferred.

These polymers, and other customary components of aqueous coating compositions, such as crosslinkers, thickeners, etc., are common knowledge and are described, for example, in WO-A-92/15405.

A particular advantage is that the finely divided oxide-type pigments and fillers mentioned at the outset can also be added to the coating compositions of the invention without the evolution of hydrogen being observed, so that it is possible to utilize the color effects which can be achieved by combining these additives with the metallic pigments.

The coating compositions of the invention are preferably prepared by dissolving the nitro compound in a solvent, which with advantage is in any case a component of the subsequent coating composition or else is compatible with the further components thereof, and then mixing the solution with the metallic pigment, preferably by stirring the metallic pigment into the solution. This metallic pigment can be employed as dry pigment or in the form of the commercially customary pastes in a high-boiling solvent such as heavy gasoline, which have a solids content of generally from 50 to 80% by weight. Subsequently, the further components of the coating composition are mixed in.

Where the metallic pigment is in the form of a paste containing solvent, the nitro compound—depending on whether it is soluble or not in the solvent or solvent mixture—can also be dissolved or dispersed in this paste by intensive mixing and this paste can then be mixed with the further components of the coating composition.

The aqueous coating compositions of the invention are notable for their stability and their advantageous color properties and can be employed with advantage for all applications, including that of automotive finishing in particular.

EXAMPLES

A) Preparation of aqueous coating materials of the invention based on polyurethane In order to test the efficacy of stabilization of the metallic pigments in aqueous systems, aqueous coating systems were prepared which further contained a transparent iron oxide yellow pigment (Sicotranse® L 1916).

Example 1

5 g of iron(III) oxide-coated aluminum pigment (Paliocrom® Gold) were stirred into a solution of 0.25 g of 4-nitrobenzoic acid in 19.5 g of ethylene glycol monobutyl ether. Subsequently, first of all 34 g of an aqueous tinting paste which was based on a water-soluble polyurethane resin and contained 14.7% by weight of transparent iron oxide yellow pigment, and then 255 g of a polyurethane-based blending varnish (described in Example 3 and Example 1.3 of WO-A-92/15405), were added. Following the addition of 7.5 g of water, a pH of 8 was established using aminoethanol. The resultant suspension was stirred at 1000 rpm using a propeller stirrer for 15 minutes.

Comparative Example V

The procedure of Example 1 was repeated but without using any 40 nitro compound.

Example 2

The procedure of Example 1 was repeated but the nitro compound used was 0.25 g of 3-nitrobenzoic acid.

Example 3

The procedure of Example 1 was repeated but the nitro compound used was 0.25 g of 3,5-dinitrobenzoic acid.

Example 4

The procedure of Example 1 was repeated but the nitro compound used was 0.25 g of 2-nitrophenylacetic acid.

Example 5

The procedure of Example 1 was repeated but the nitro compound used was 0.25 g of 3-nitroacetophenone.

Example 6

The procedure of Example 1 was repeated but the nitro compound used was 0.25 g of 4-nitroacetophenone.

Example 7

The procedure of Example 1 was repeated but the nitro compound used was 0.25 g of picric acid.

Example 8

The procedure of Example 1 was repeated but the nitro compound used was 0.25 g of 3-nitrophthalic acid.

Example 9

650 g of iron(III) oxide-coated aluminum pigment (Paliocrom Gold) were introduced into a solution of 32.5 g of 3-nitrobenzoic acid in 350 ml of 1,2-propylene glycol monomethyl ether. The mixture was kneaded in a kneading apparatus for 1 h. Then 7.7 g of the resultant paste were slurried in 19.5 g of ethylene glycol monobutyl ether. Subsequently, first of all 34 g of an aqueous tinting paste which was based on a water-soluble polyurethane resin and contained 14.7% by weight of transparent iron oxide yellow pigment, and then 255 g of a polyurethane-based blending varnish (described in Example 3 and Example 1.3 of WO-A-92/15405) were added. Following the addition of 7.5 g of water, a pH of 8 was established using aminoethanol. The resultant suspension was stirred at 1000 rpm using a propeller stirrer for 15 minutes.

Example 10

The procedure of Example 9 was repeated but the nitro compound used was 32.5 g of 3-nitrophthalic acid.

B) Testing of the coating materials of the invention

To test their stability, the coating materials from Examples 1 to 10 were placed in a wash bottle with a twin-chamber gas bubble counter mounted on it and were kept at a constant temperature of 40° C. for 30 d.

Compiled in the table below are the amounts of hydrogen formed during this time.

TABLE

| Coating material from Example | Gas evolved after 30 d |
|---|---|
| 1 | 0.5 ml |
| 2 | 0.5 ml |
| 3 | 0.5 ml |
| 4 | 2 ml |
| 5 | 3 ml |
| 6 | 2 ml |
| 7 | 0.5 ml |
| 8 | 2 ml |
| 9 | 0.5 ml |
| 10 | 0.5 ml |
| V | >20 ml after 1 d |

We claim:

1. An aqueous coating composition comprising a water-soluble or water-dispersible film-forming polymer, a metallic pigment based on coated metal flakes, an organic nitro compound which is functionalized with a carboxylic acid, alcohol, aldehyde or ketone group, and an organic solvent in which the nitro compound is soluble.

2. The coating composition of claim 1, wherein the metallic pigment comprises metal oxide-coated metal flakes.

3. The coating composition of claim 1, wherein the metallic pigment is aluminum flakes coated with a metal oxide selected from the group consisting of iron oxide, titanium dioxide, chromium oxide, and mixtures thereof.

4. The coating composition of claim 1, which comprises an aromatic nitro compound.

5. The coating composition of claim 1, wherein the solvent is selected from the group consisting of an alkylene glycol monoether, an alkylene glycol ether acetate, a ketone, and mixtures thereof.

6. The coating composition of claim 1, wherein the film-forming polymer is selected from the group consisting of a polyurethane resin, polyester resin, acrylic resin, an alkyd resin, and mixtures thereof.

7. The coating composition of claim 1, which further comprises finely divided oxide-type pigments.

8. A process for preparing the coating composition of claim 1, which comprises dissolving the nitro compound in the organic solvent to form a solution, then mixing this solution first with the metallic pigment and subsequently with a mixture comprising the water-soluble or water-dispersible film-forming polymer.

9. A pigment preparation comprising a metallic pigment based on coated metal flakes, an organic nitro compound which is functionalized with a carboxylic acid, alcohol, aldehyde or ketone, and an organic solvent in which the nitro compound is soluble or dispersible.

10. A method of stabilizing metallic pigments based on coated metal flakes in aqueous coating compositions, which comprises mixing said metallic pigments together with organic nitro compounds which are functionalized with a carboxylic acid, alcohol, aldehyde or ketone in said coating composition.

11. The coating composition of claim 1, wherein the metallic pigment is present in an amount of 0.1–10 wt % relative to the total weight of the coating composition.

12. The coating composition of claim 1, wherein the nitro compound is a compound selected from the group consisting of 2-nitrobenzoic acid, 3-nitrobenzoic acid, 4-nitrobenzoic acid, 3,5-dinitrobenzoic acid, 2-nitrophthalic acid, 3-nitrophthalic acid, 3-nitrosalicylic acid, 5-nitrosalicylic acid, 2-nitrophenylacetic acid, 2-nitrophenol, 3-nitrophenol, 4-nitrophenol, 2,3,5-trinitrophenol, 2-nitrobenzaldehyde, 3-nitrobenzaldehyde, 4-nitrobenzaldehyde, 2-nitroacetophenone, 3-nitroacetophenone, 4-nitroacetophenone and mixtures thereof.

13. The coating composition of claim 1, wherein the nitro compound is present in an amount of 0.01–10 wt % relative to the total weight of the coating composition.

14. The coating composition of claim 1, wherein the nitro compound is present in an amount of 0.03–1 wt % relative to the total weight of the coating composition.

15. The coating composition of claim 1, wherein the organic solvent is selected from the group consisting of ethylene glycol monopropyl ether, ethylene glycol monobutyl ether, 1,2-propylene glycol monomethyl ether, 1,2-propylene glycol monoisopropyl ether, propylene glycol monoethyl ether acetate, methyl ethyl ketone, methyl propyl ketone, methyl isobutyl ketone, and methyl hexyl ketone.

16. The coating composition of claim 1, further comprising a crosslinker, a thickener, or mixtures thereof.

17. The process of claim 8, wherein the metallic pigment is present in an amount of 0.1–10 wt % relative to the total weight of the coating composition.

18. The process of claim 8, wherein the nitro compound is a compound selected from the group consisting of 2-nitrobenzoic acid, 3-nitrobenzoic acid, 4-nitrobenzoic acid, 3,5-dinitrobenzoic acid, 2-nitrophthalic acid, 3-nitrophthalic acid, 3-nitrosalicylic acid, 5-nitrosalicylic acid, 2-nitrophenylacetic acid, 2-nitrophenol, 3-nitrophenol, 4-nitrophenol, 2,3,5-trinitrophenol, 2-nitrobenzaldehyde, 3-nitrobenzaldehyde, 4-nitrobenzaldehyde, 2-nitroacetophenone, 3-nitroacetophenone, 4-nitroacetophenone and mixtures thereof.

19. The process of claim 8, wherein the nitro compound is present in an amount of 0.01–10 wt % relative to the total weight of the coating composition.

20. The process of claim 8, wherein the organic solvent is selected from the group consisting of ethylene glycol monopropyl ether, ethylene glycol monobutyl ether, 1,2-propylene glycol monomethyl ether, 1,2-propylene glycol monoisopropyl ether, propylene glycol monoethyl ether acetate, methyl ethyl ketone, methyl propyl ketone, methyl isobutyl ketone, and methyl hexyl ketone.

* * * * *